Nov. 28, 1961   G. E. MUELLER   3,010,416
RADIO CONTROL SYSTEM
Filed May 17, 1945   3 Sheets-Sheet 1
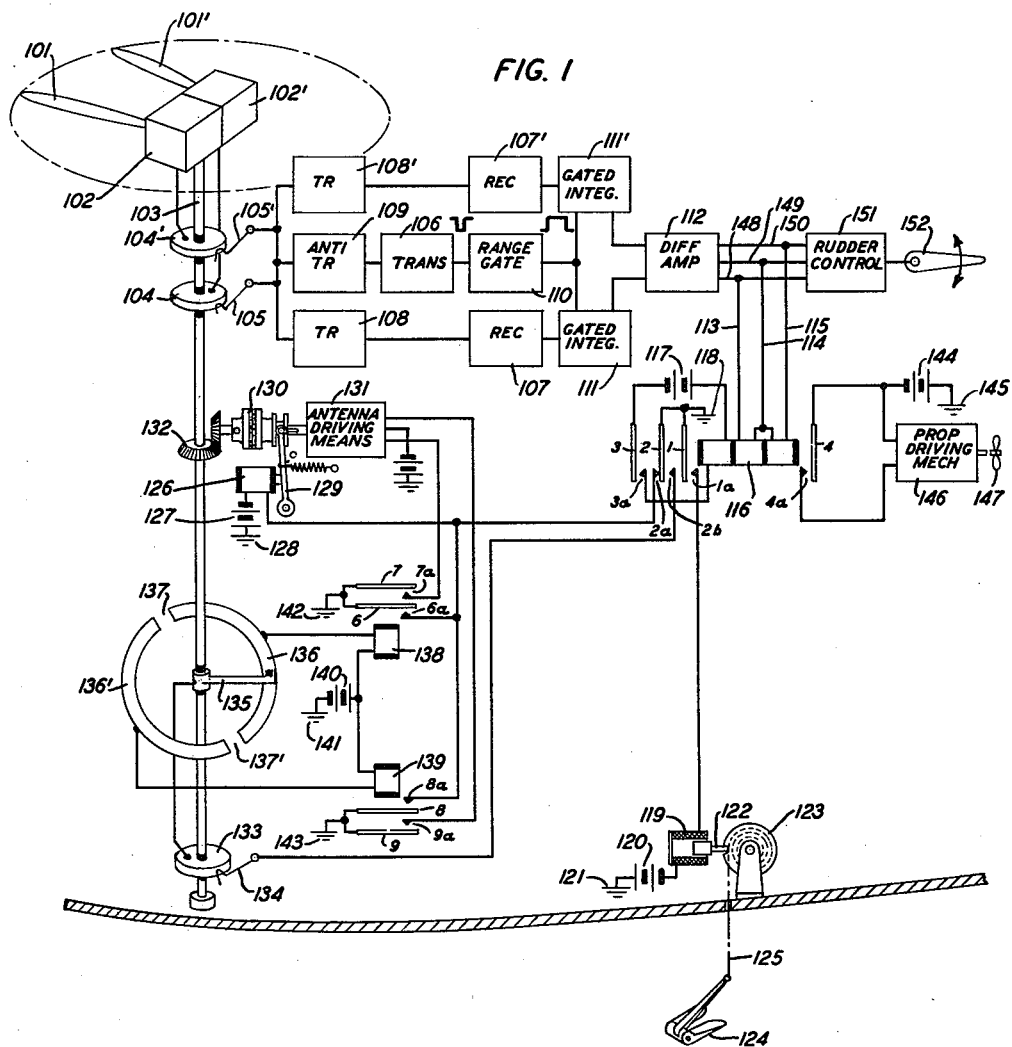
FIG. 1
FIG. 5
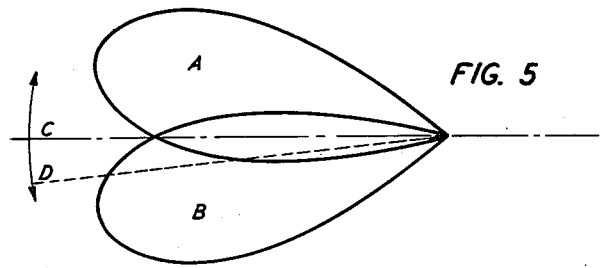
INVENTOR
G. E. MUELLER
BY
E. V. Griggs
ATTORNEY Nov. 28, 1961  G. E. MUELLER  3,010,416
RADIO CONTROL SYSTEM Filed May 17, 1945  3 Sheets-Sheet 3

INVENTOR
G. E. MUELLER
BY
E. V. Griggs
ATTORNEY

United States Patent Office 3,010,416
Patented Nov. 28, 1961

3,010,416
RADIO CONTROL SYSTEM
George E. Mueller, Red Bank, N.J., assignor to Bell Telephone Laboratories, Incorporated, New York, N.Y., a corporation of New York
Filed May 17, 1945, Ser. No. 594,246
8 Claims. (Cl. 114—23)

This invention relates in general to the transmission and reception of directive radio signals and in particular to an automatic radio steering mechanism which may be utilized to guide torpedoes and other mobile bodies.

For some time, radio systems have been in use whereby the movements of a mobile body are controlled in response to a signal transmitted from a remote point. Typical of the early patents in this field are 1,387,850 and 1,370,688 to John Hays Hammond, Jr. and 2,109,475 to W. H. Fanning.

More recently, compressional wave systems have been developed for steering torpedoes in response to echo signals. Certain disadvantages resulting in decreased sensitivity of operation are inherent in most sonically controlled systems, such as water noise and unbalance through unequal noise of operation of the mechanical parts.

In order to overcome these and other disadvantages, and to provide certain advantages which will be apparent hereinafter, a radio steering system has been developed for use in mobile bodies which operates in response to radio echo signals.

One object of this invention is to secure an improved automatic steering and searching system for use on all types of mobile bodies.

A second object of this invention is to automatically steer mobile bodies such as aircraft, torpedoes, and projectiles to their respective destinations.

A third object of this invention is to secure an increased range of operation in an echo signal tracking device for torpedoes and other mobile bodies.

A fourth object of this invention is to minimize operational noise in an echo-signal steering and detecting system for torpedoes and other mobile bodies.

A fifth object of this invention is to provide a tracking mechanism for torpedoes and other mobile bodies responsive only to targets within a selected range.

A sixth object of this invention is to provide a system whereby an antenna with a directional radiation pattern which is initially searching will respond to a predetermined received signal to align itself in a designated direction.

These and other objects hereinafter apparent are attained in the various embodiments of the present invention.

One embodiment of the invention relates to a radio searching and steering device for torpedoes. A torpedo equipped with radio transmitting and receiving means initially rests at anchor searching the surrounding environment for possible targets by means of electromagnetic radiation. When a target comes within a predetermined range of the torpedo, echo pulses reflected from the target acuate the torpedo to disconnect the anchor and proceed in the direction of the target.

During the searching period, a pair of dielectric rod antennas is supported parallel to the water's surface and continuously rotated through 360 degrees by means of a vertically extending shaft which is geared to a driving mechanism inside the torpedo. The searching antennas have a radiation pattern in the horizontal plane which comprises a pair of highly directive overlapping major lobes. As in conventional radio ranging and detecting systems, the present embodiment is adapted to use pulsed microwave signals.

As the radiation pattern sweeps through space, pulsed signals impinge on possible targets within the searching range, and are reflected back to the torpedo where they are picked up by the transceiving antennas. However, as long as the targets are outside of its predetermined operating range, the torpedo remains at anchor searching. By means of a range-gating circuit, the receivers are unblocked for a designated period after the transmitted pulse, thereby making the apparatus responsive only to targets within the desired range.

When a target comes within operating range of the torpedo, the receiving mechanism responds to echo pulses to operate a servo which disables the searching mechanism, disconnects the anchor, and initiates motion of the torpedo in the direction of the target. The torpedo is held on its course to the target in response to reflected echo pulses. Whenever the bisector of the antenna pattern is directed away from the target, the electrical output of the torpedo receiving circuit is unbalanced, thus operating a servo to initiate rudder action, returning the torpedo to its course.

The tracking torpedo is only one of many useful adaptations of the electromagnetic steering mechanism described. For instance, such a mechanism may be employed for directing machine guns or cannons at a target. Steering devices of this type can be mounted on rocket bombs with a suitable target selecting mechanism comprising a narrow range gate which could be set on a particular target by the pilot of the releasing airplane. Such a steering device might also be usefully employed on rocket projectiles. In peacetime, a mechanism of this type could be utilized to automatically steer a ship into a harbor by use of suitably placed buoys in the form of corner reflectors. Similar automatic direction of airplanes is possible.

The invention will now be described with reference to the accompanying drawings, of which:

FIG. 1 shows a schematic diagram of an automatic searching and steering mechanism for torpedoes which utilizes pulsed microwave signals. The two transceiving antennas in this embodiment which rotate while searching, are energized simultaneously, each antenna feeding energy into a separate receiver.

FIG. 5 shows graphically the overlapping main lobes of the directional antenna radiation patterns in a horizontal plane.

Figure 2:
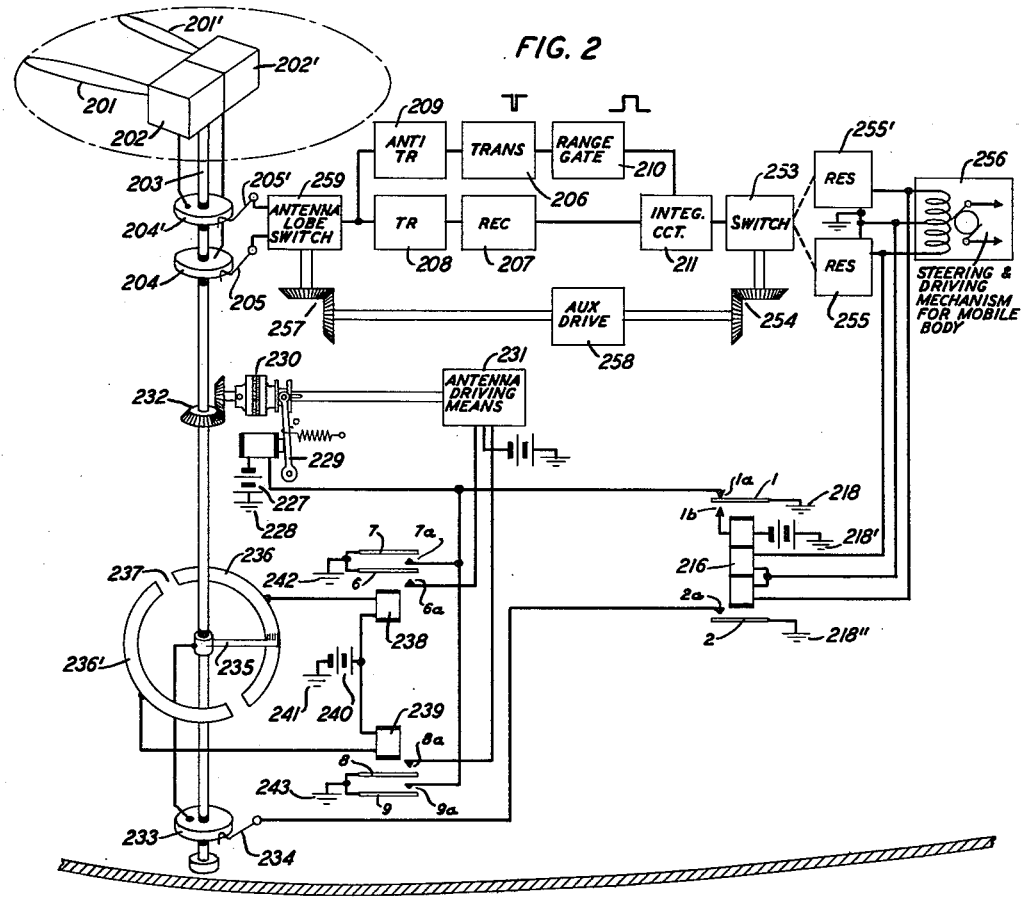
FIG. 2 shows an automatic searching and steering mechanism also employing pulsed microwave signals which can be utilized on any type of mobile body. In this embodiment lobe-switching is employed to energize the antennas alternately.

The structure of the microwave searching and tracking antenna shown in FIG. 1 comprises the following elements.

A pair of antennas 101 and 101', each having a radiation pattern in a horizontal plane which takes the form of a highly directive major lobe and relatively small minor lobes, are mounted parallel to each other so that the two major lobes A and B overlap as shown in FIG. 5 of the drawings. The antennas 101 and 101' may comprise two identical tapered polystyrene rods hereinafter known as "polyrods," of the type described in the applicant's copending application, Serial No. 469,284, filed December 17, 1942. The wave guide polyrod holder 102—102' is mounted on the rotatable shaft 103 which is associated with the gear 132 and the interlocking clutch 130 connected to the antenna driving means 131. The shaft 103 is provided with slip rings 104 and 104', and their corresponding contactors 105 and 105' by means of which the circuits of the antennas 101 and 101' are connected to the transmitter circuit 106 through the anti-TR box 109 and also to their respective receiving circuits 107 and 107' through the TR boxes 108 and 108'. The transmitter 106 may include a conventional source of high frequency oscillation such as a magnetron, a pulse generator, and a base frequency oscillator. The anti-TR box 109 and the TR boxes 108 and 108' are of a conventional type.

Gated integrator circuits 111 and 111', of a type well-known in the art, each including a multi-element vacuum tube, are connected to the outputs of their respective receivers 107 and 107'.

The range gating circuit 110, comprising a "single-kick" multivibrator and a clipper amplifier, is connected between the timing circuit of the transmitter 106 and the grids of the vacuum tubes of the gated integrator circuits 111 and 111'. The gated integrator circuits 111 and 111' are connected to the high and the low sides, respectively, of the conventional differential amplifier 112, which is balanced with respect to ground.

The output of the differential amplifier 112 is connected through the conductors 148, 149, and 150 to the rudder control 151, which comprises a conventional servo mechanism adapted to operate the rudder 152 in the required direction.

Through conductors 113, 114, and 115, the output of the differential amplifier 112 is also connected to the relay 116, with which are associated the armatures 1, 2, 3, and 4 and their respective contacts 1a, 2a, 2b, 3a, and 4a. Armatures 1 and 2 are connected to ground 118, and armature 3 is connected to the locking battery 117.

To the contact 1a for anchor control is connected the energizing circuit of the electromagnet 119, which includes the battery 120 connected to ground 121. The pin 122, which is responsive to the electromagnet 119, maintains the supporting cable 125 of the anchor 124 wrapped on the windlass 123.

The 2b contact of the relay 116 for controlling torpedo orientation is connected to the shaft 103 by means of the slip ring 133 and its contactor 134. The armature 135, which is rigidly connected to the shaft 103, is adjusted to ride on the conducting split ring 136—136', the two halves of which are separated by means of the insulating elements 137 and 137'. The split ring 136 is connected to the circuit of the relay 138, while the split ring 136' is connected to the circuit of the relay 139. The battery 140 connected to ground 141 serves as the energizing source for both of the relays 138 and 139. The armatures 6 and 7, connected to ground 142, are responsive to the relay 138, while the armatures 8 and 9 connected to ground 143 are responsive to the relay 139. The contact 6a of the relay 138 and the contact 8a of the relay 139 are connected to the circuit of the electromagnet 126 which includes the battery 127 and ground 128. The armature 129 is responsive to the electromagnet 126 to actuate the clutch 130 to disengage the antenna driving means 131 from the shaft 103, to which it is connected through the gears 132. The contact 7a is connected to initiate operation of the antenna driving means in one direction, while the contact 9a is connected to initiate operation of the antenna driving means in the opposite direction.

The contact 2a of the relay 116 for disabling the searching mechanism is also connected to the circuit of the electromagnet 126 and to the antenna driving means 131.

The contact 3a of the relay 116 is positioned to close the circuit to the battery 117.

The contact 4a of the relay 116 is positioned to close the circuit of the conventional propeller driving mechanism 146, which operates the propeller 147.

Operation of the microwave searching and tracking torpedo will now be described in detail with reference to FIG. 1 of the drawings.

In the initial stage of operation the torpedo is moored to the anchor 124, while the antennas 101 and 101' are continuously swept through a complete circle in a horizontal plane. The radiation pattern comprising the two overlapping lobes A and B and their bisector C is swept through 360 degrees by the circular motion of the polyrods 101 and 101' during the searching period.

The polyrods 101 and 101' are moved in their circular path by the rotation of shaft 103, which is driven through the gear 132 and the interlocking clutch 130 by the antenna driving means 131. Contactors 105 and 105' ride on the slip rings 104 and 104' as the shaft 103 rotates, thereby connecting the transmitting circuit 106 and the receiving circuits 107 and 107' during their respective periods of operation to the respective polyrods 101 and 101'. The microwave pulses radiated by the antennas 101 and 101' are initiated in the transmitting circuit 106 by the magnetron which is keyed by means of a pulse generator fed from a base frequency oscillator. The pulsing period of the transmitting circuit 106 is determined by the time required for a pulse radiated by the antennas on the torpedo to be reflected back from an object at the maximum desired searching range. In order to energize the antennas 101 and 101' simultaneously, pulses from the transmitting circuit 106 are fed to them through two respectively separate circuits which include the contactors 105 and 105' riding on their respective slip rings 104 and 104'. Transmitter pulses are blocked out of the receiving circuits 107 and 107' by means of the TR boxes 108 and 108' respectively. When the echo pulses return to the torpedo from objects within searching range, they are picked up through the polyrods 101 and 101'. The energy picked up by each polyrod is fed separately into one of the two receivers 107 and 107' through one of the two distant parallel circuits which include the wave-guide chambers 102 and 102', the slip rings 104 and 104' and their respective contactors 105 and 105'. Received pulses are kept out of the transmitter by means of an anti-TR box 109.

In order to condition the receiving apparatus to respond only to those echo pulses returning from targets within a certain predetermined range, a range gating circuit 110 functions in the following manner. A negative pulse from the transmitter timing circuit triggers the so-called "single-kick" multivibrator, the output of which is fed into the clipper amplifier. The voltage output of the clipper amplifier takes the form of a square-topped pedestal pulse which is applied to unblock the integrator circuits 111 and 111' for the reception of signals for a definite interval following the transmitted pulse. The duration of the pedestal pulse, which is usually from 10 to 20 microseconds, is determined by the time required for a pulse transmitted from the torpedo to reach and return from a target at the maximum desired operating range from the torpedo.

As soon as a body comes within torpedo operating range, the torpedo responds in the following manner. Pulses reflected from the target are picked up by the searching antennas 101—101', which have in a given plane radiation receiving characteristics similar to the radiation transmitting characteristics shown graphically in FIG. 5. As the searching antennas move around, the line C determined by the points of intersection in a given plane of the overlapping major lobe patterns A and B will be pointed away from the target, and hence, the responses in the receivers 107 and 107' will be unequal, thus causing an unequal response in the integrator circuits 111 and 111' which have been unblocked by the pedestal pulse, thereby upsetting the balance in the differential amplifier 112, causing a positive or negative current to flow depending on the direction of the detected target.

Current flowing in either direction from the differential amplifier 112 through the conductors 113 and 114 or 115 and 114 will energize the relay 116 which is locked in operation by the closure of the number 3 armature and contact 3a to the battery source 117.

The locking in operation of the relay 116, which occurs as soon as a body comes within operating range of the torpedo, actuates machinery to disconnect the anchor, disable the searching mechanism, orient the antennas and fix their position with respect to the torpedo axis, and initiate operation of propulsion machinery. These operations are achieved as follows:

The anchor 124 is detached from the body of the torpedo when the number 1 armature of the relay 116 engages its contact 1a. Through the armature and contact 1—1a, the ground 118 is applied to the energizing circuit of the electromagnet 119. The pin 122 is thereby attracted, releasing the anchor supporting cable 125 to unwind from the windlass 123, permitting the anchor 124 to drop away from the torpedo.

The torpedo searching mechanism is disabled when the number 2 armature of the relay 116 is attracted to break its 2a contact and engage its 2b contact. When the 2a contact breaks, ground 118 is disconnected from the antenna driving means 131 and also from the energizing circuit of the electromagnet 126. This deenergizes the magnet 126, which thereby releases the arm 129, causing the clutch 130 to disengage the antenna driving mechanism 131 from the intermeshing gears 132, whereby the shaft 103 ceases to be rotated through 360 degrees.

The orientation of the antennas with respect to the torpedo axis is controlled by the engagement of the number 2 armature of the relay 116 and its 2b contact. When the target comes within operating range, rotation of the shaft 103 is brought about in the following manner to bring the antennas 101—101' into alignment with the torpedo axis. The ground 118 is applied to the shaft 103 through a circuit which comprises the armature and contact 2—2b and the slip ring 133 and its contactor 134.

If the line C determined by the points of intersection of the antenna patterns A and B is to the right of alignment with respect to the keel of the torpedo, the wiper 135 rides on the split ring 136, thus applying ground to the circuit of the relay 138. The energized relay 138 thereupon actuates armatures 6 and 7 to make their respective contacts 6a and 7a. Through the armature and contact 6—6a, the ground 142 is applied to the circuit of the electromagnet 126, causing it to attract its armature 129, thereby engaging the antenna driving means 131 to the shaft 103 through the meshed gears 132. The ground 142 is also applied through the armature and contact 7—7a to initiate operation of the antenna driving means 131 in the desired direction. Thereupon, the shaft 103 carrying the antennas 101—101' is moved around until the wiper 135 contacts the insulating element 137, removing the ground from the circuit of the relay 138, and cutting off operation of the driving means. This locks the line C determined by the points of intersection of the antenna radiation patterns A and B in alignment with the torpedo keel.

Similarly, if the line C determined by the points of intersection of antenna patterns A and B is to the left of alignment with respect to the keel of the torpedo, the wiper 135 rides on the split ring 136', applying ground to the circuit of the relay 139, which is also energized by current from the battery 140. The energized relay 139 actuates armatures 8 and 9 to make their respective contacts 8a and 9a, thus causing the antenna driving means to be engaged to the shaft 103 and also initiating operation of the antenna driving means in a direction opposite to the direction of motion initiated by relay 138. Thus, as described above, the shaft 103 carrying antennas 101—101' is moved around until the wiper 135 engages the insulating element 137, cutting off the motion, and locking the antennas in position with respect to the keel. Operation of propulsion machinery, which may either be of the conventional type shown, or jet propulsion type, is initiated by engagement of the number 4 armature of the relay 116 and its contact 4a. This closes the circuit of the propeller driving mechanism 146, which operates the propeller 147, to its energizing battery 144.

In either case, as the antennas 101 and 101' are slowly rotated to align them with the keel of the torpedo, the torpedo itself rotates by means of the rudder 152 and the driving mechanism 146 to maintain the alignment of the antenna on the target.

When the antennas 101—101' are positioned so that the line C determined by the points of intersection of the patterns A and B is aligned with the keel of the torpedo, the torpedo moves toward the target, maintaining its course as follows. Assume that the target is in a direction D with respect to the antenna pattern A—B. Then the received radiation response picked up by the antenna 101, which corresponds to the lobe B, will be appreciably larger than the response picked up by the antenna 101' corresponding to lobe A. Thus, a larger signal is fed into the receiver 107 and through the gated integrator circuit 111 than is fed through the receiver 107' and the gated integrator circuit 111', thereby upsetting the electrical balance and causing current to flow in the differential amplifier 112. Current flows from the differential amplifier 112 into the rudder control circuit 151, which actuates the rudder 152 to move to the right until the line C determined by the points of intersection of the radiation patterns A and B is again aligned with the target.

When the bisector C is trained on the target, the responses in the receivers 107 and 107' are equal, so that the output of the differential amplifier 112 is zero. It is obvious that when the target is to the right of the antenna bisector C, current flows in the differential amplifier 112, in a direction opposite to that described above, and the rudder 152 is actuated to move to the left.

The torpedo therefore describes a slightly weaving course toward the center of the target.

The embodiment of the invention shown in FIG. 2 is designed to function as an automatic piloting and tracking device for any type of mobile body. Except for the differences which will be pointed out below, the structure of the embodiment of FIG. 2 is largely similar to that described with reference to the embodiment of FIG. 1. In order to emphasize this similarity, corresponding numbers have been used in FIGS. 2, 3 and 4 to designate like elements to those in FIG. 1. For instance, the shaft 203 of FIG. 2 corresponds to the shaft 103 of FIG. 1, and the transmitter 206 corresponds to the transmitter 106.

Instead of the two receivers of FIG. 1, the system of FIG. 2 employs a single receiver 207, of any well-known type, and a lobe switching mechanism 259 which is essentially similar to that described in application Serial No. 455,322 of A. C. Beck, filed August 19, 1942. The lobe switch 259 is connected to the auxiliary drive 258 through the meshed gears 257 and associated shafts. To the lobe switch 259 is connected a parallel circuit which includes in one branch the TR box 208 and conventional receiver 207, while the other branch includes the anti-TR box 209, and conventional transmitter 206, and the range gating circuit 210, which is similar to the range gating circuit 110. The receiver 207 and the range gating circuit 210 are connected to the single integrator circuit 211.

The output of the integrator circuit 211 is adapted to be switched alternately between the condenser reservoirs 255 and 255' by means of the switch 253, which is of any type well-known in the art, such as an electronic switch and is connected through the gears 254 and associated shafts to the auxiliary lobe switching drive 258. The output from the balanced reservoir circuits 255 and 255' is fed through one circuit to the relay 216, which is essentially similar to the relay 116 and through a parallel circuit to the steering and driving mechanism 256. The mechanism 256 may comprise a servo which initiates operation of the driving mechanism and controls the steering of the pilotless mobile body.

The operation of the embodiment of FIG. 2 is in general similar to the operation described with reference to FIG. 1 above. However, certain differences are apparent which will now be described.

The two polyrods 201 and 201', instead of being energized simultaneously with two separate receivers responsive thereto as in FIG. 1, are energized alternately by means of the antenna lobe switch 259 which is driven through the meshed gears 257 by means of the auxiliary drive 258. Pulsed microwave signals from the transmitting circuit 206 are fed alternately to the antennas 201 and 201' through the lobe switch 259 and their respectively separate circuits. The radiation pattern produced is similar to that shown in FIG. 5, except that the lobes A and B appear alternately instead of simultaneously. Received pulses are picked up by the antennas 201 and 201' during their alternate energizel periods. Though the lobe switching arrangement, the receiver 207 is responsive first to the signals picked up by one antenna and then to the signals picked up by the other antenna. The range gating circuit 210 functions as described with reference to the circuit 110 of FIG. 1 to condition the integrator circuit 211 to respond only to signals coming from targets within the desired operating range.

The output of the integrator circuit 211 is switched alternately between the reservoirs 255 and 255' by means of the switch 253. The switch 253 is of any type well known in the art, such as an electronic switch, and is driven synchronously with the lobe switch 250 by the auxiliary drive 258 operating through the gear 254. Thus, the output energy derived from signals picked up by antenna 201 is stored in the reservoir 255, while the output derived from signals picked up by the antenna 201' is stored in the reservoir 255'.

As in the previous embodiment shown in FIG. 1, the antennas 201 and 201' are initially searching, sweeping out 360 degrees in a horizontal plane. When a target comes within operating range of the body, the relay 216 is locked in operation, cutting off the searching drive, aligning the bisector C of the antenna pattern A—B, with the longitudinal axis of the body, and initiating operation of the driving means of the mobile body, in a manner similar to that described with reference to FIG. 1 above. Whenever the bisector C of the antenna pattern A—B is pointed away from the target in such a direction that correspondingly more energy is picked up by the antenna 201 than is picked up by the antenna 201', then a greater amount of energy is stored in the reservoir 255 than is stored in the reservoir 255'. The electrical balance of the circuit is thus upset, causing current to flow in such a direction as to initiate operation of the steering drive 256 to restore the body to its course.

If the torpedo is to be planted in advance of the appearance of potential targets, the searching mechanism will be a highly desirable feature. However, if the torpedo is to be planted by ship or airplane, with a particular target in view, the searching mechanism is unnecessary. With such a use in mind, the embodiments of FIGS. 3 and 4 have been designed to omit the searching mechanism and incorporate only the steering mechanism.

Figure 3:
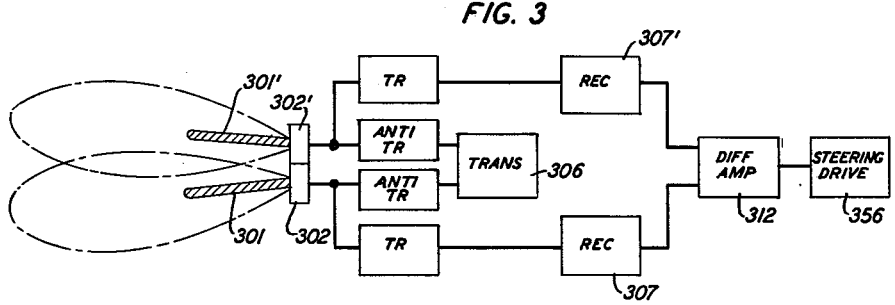

With the exception of the omitted searching mechanism, FIG. 3 shows a radio steering circuit for a mobile body which operates in a manner similar to the circuit of FIG. 1. The antennas 301 and 301', which are energized simultaneously to alternately transmit and receive microwave pulses, are rigidly fixed in position with respect to the axis of the mobile body.

Figure 4:
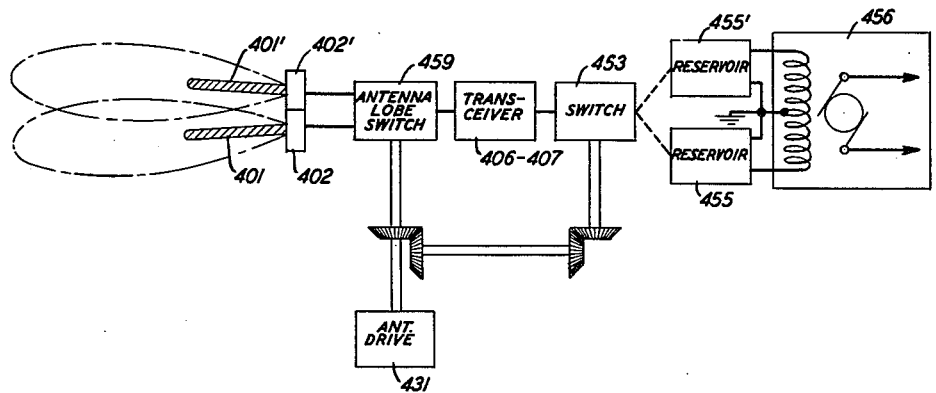
FIGS. 3 and 4 show microwave automatic steering non-searching mechanisms employing fixed antenna mountings, without and with lobe-switching respectively.

The operation of the circuit of FIG. 4, which also omits the searching mechanism, is similar to that of FIG. 2. The antenna lobe switch 459 is employed to alternately energize the antennas 401 and 401' to transmit microwave pulses. Pulses are initiated and received in the transceiving circuit 406—407, which may comprise any one of a number of circuits well known in the art.

This invention is not limited to any particular form or any particular piece of apparatus shown in the several embodiments described herein.

For instance, while all the systems described are adapted to use microwave pulses, such as employed by conventional radio ranging and detecting systems, the invention may also be used in other ranging systems such as systems using frequency variation.

Similarly, although polyrod antennas are shown in all of the embodiments described, other types of directional antennas might serve equally well.

What is claimed is:

1. In combination, a mobile object including a steering means, a radio receiver, a directional antenna associated with said receiver and having a radiation pattern symmetrical about an axis in at least one plane, a first means connected to said antenna for continuously changing the direction of said antenna pattern during the period of no reception, a second means connected to said first means and said receiver and responsive to received energy for disabling said first means and maintaining the axis of symmetry of said antenna pattern aligned with the mean path of the received radiation, a third means connected to said mobile object and said receiver and responsive to a predetermined received signal for setting said object in motion and fixing the position of said antenna pattern with respect to said object during transit.

2. In combination, a transceiver including transmitting and receiving means, an antenna in energy transfer relation with said transceiver and having a directional radiation pattern, a first means connected to said antenna to cause said antenna and the directional radiation pattern thereof to move continuously through a predetermined arc to locate objects, a second means connected to said antenna and said first means and selectively responsive to received energy reflected from said objects a predetermined time interval after transmission from said transceiver for disabling said first means and for continuously aligning said antenna with respect to the direction of said received energy irrespective of variations in said direction.

3. In combination, a mobile object including propelling means, a steering mechanism, a radio receiver, a directional antenna connected thereto for receiving a pair of distinct components of an incoming wave, a first means connected to said antenna for continuously changing the directions of receiving action of said antenna during the period of no reception, and a second means connected to the first means and to said mechanism for disabling the first means, initiating action of said propelling means and maintaining during transit of said object the heading of said object aligned with the path of the received radiation, said second means being operative in response to components of equal intensity.

4. A mechanism connected to a torpedo for directing said torpedo to a target which comprises in combination a pair of antennas having a directional radiation pattern comprising a pair of overlapping angularly related lobes, driving means connected to said antennas to impart a searching motion to said antenna pattern, a transmitting circuit associated with said antennas, receiving means associated with said antennas and arranged to respond separately to the received signals from each said antenna, gating means connected to said transmitting circuit and said receiving circuit to condition said receiving circuit to respond only to signals reflected from targets within a predetermined range, and a balanced electrical circuit responsive to the output of said receiving circuit, said balanced circuit arranged to give zero output when equal amounts of energy are received from each of the two antennas, relay means responsive to the output of said balanced circuit to disable said antenna searching means, relay means responsive to the output of said balanced circuit to fix the orientation of said antenna pattern with respect to the heading of said torpedo, propelling means connected to said torpedo, relay means responsive to the output of said balanced circuit for initiating operation of said propelling means, a steering mechanism connected to said torpedo, means responsive to the output of said balanced circuit to actuate said steering mechanism.

5. A mechanism connected to a mobile body for directing said body to a target which comprises in combination a pair of overlapping angularly related lobes, driving means connected to said antennas to impart a searching motion to said antenna pattern, a transmitting circuit in energy transfer relation with said antennas, receiving means in energy transfer relation with said antennas and arranged to respond separately to the received signals from each said antenna, gating means connected to said transmitting circuit and said receiving circuit to condition said receiving circuit to respond only to signals reflected from targets within a predetermined range, a balanced electrical circuit responsive to the output of said receiving circuit, said balanced circuit arranged to give zero output when equal amounts of energy are received from each of the two antennas, relay means responsive to the output of said balanced circuit to disable said antenna searching means, relay means responsive to the output of said balanced circuit to fix the orientation of said antenna pattern with respect to the heading of said mobile body, driving means connected to said mobile body, relay means responsive to the output of said balanced circuit for initiating operation of said driving means, a steering mechanism connected to said mobile body, means responsive to the output of said balanced circuit to actuate said steering mechanism.

6. In combination, a mobile body, electromagnetic searching means connected thereto and continuously operative to locate targets, and means connected to said electromagnetic searching means and responsive to a signal of predetermined character from one said target to disable said searching means and initiate motion of said mobile body in the direction of said target.

7. In combination, a mobile body, an electromagnetic transceiver including signal transmitting and receiving signal means connected thereto, searching means connected to said transceiver and continuously operative to locate targets, and means connected to said searching means and responsive to a received signal from one said target which is time delayed by not more than a predetermined interval with respect to a given transmitted signal to disable said searching means and initiate motion of said mobile body in the direction of said target.

8. In combination with a mobile body having propelling means and steering means, a system connected to said body for controlling operation of said propelling means and said steering means, said system comprising in combination a radio transceiver including signal transmitting means and signal receiving means, an antenna system connected to said transceiver, said antenna system having a radiation characteristic which is substantially concentrated within a relatively narrow angle of spread in one plane, a first means to cause said antenna characteristic to scan through an angular range which is many times broader than the angle of spread of said characteristic, and a second means connected to said antenna system and responsive to a signal received after a predetermined time interval from an object within said range to disable said scanning means, to initiate operation of said propelling means, and to control the alignment of said antenna characteristic and said mobile body with respect to the mean path of said received energy.

References Cited in the file of this patent

UNITED STATES PATENTS

| | | |
|---|---|---|
| 1,137,222 | Leon | Apr. 27, 1915 |
| 1,513,108 | Hammond | Oct. 28, 1924 |
| 1,588,932 | Blair | June 15, 1926 |
| 1,850,080 | Leib | Mar. 22, 1932 |
| 1,892,431 | Hammond | Dec. 27, 1932 |
| 2,109,475 | Fanning | Mar. 1, 1938 |
| 2,166,991 | Guanella | July 25, 1939 |
| 2,176,469 | Moueix | Oct. 17, 1939 |
| 2,257,757 | Moseley | Oct. 7, 1941 |
| 2,276,235 | Lamb | Mar. 10, 1942 |
| 2,308,521 | Lear | Jan. 19, 1943 |
| 2,403,527 | Hershberger | July 9, 1946 |
| 2,403,622 | Tuska | July 9, 1946 |
| 2,448,007 | Ayres | Aug. 31, 1946 |
| 2,409,448 | Rost et al. | Oct. 15, 1946 |
| 2,410,424 | Brown | Nov. 5, 1946 |
| 2,412,612 | Godet | Dec. 17, 1946 |
| 2,414,791 | Barrow | Jan. 28, 1947 |
| 2,416,088 | Deerhake | Feb. 18, 1947 |
| 2,416,562 | Alexanderson | Feb. 25, 1947 |
| 2,417,112 | Kettering | Mar. 11, 1947 |
| 2,420,016 | Sanders | May 6, 1947 |
| 2,423,644 | Evans | July 8, 1947 |
| 2,480,829 | Barrow et al. | Sept. 6, 1949 |
| 2,499,349 | Ayres | Mar. 7, 1950 |
| 2,513,279 | Bradley | July 4, 1950 |

FOREIGN PATENTS

| | | |
|---|---|---|
| 455,765 | Great Britain | Oct. 27, 1936 |
| 458,734 | Great Britain | Dec. 24, 1936 |